(12) United States Patent
Sakurai

(10) Patent No.: US 7,679,679 B2
(45) Date of Patent: Mar. 16, 2010

(54) SYNCHRONOUS DETECTOR

(75) Inventor: Hirofumi Sakurai, Kanagawa (JP)

(73) Assignee: NEC Electronics Corporation, Kawasaki, Kanagawa (JP)

(*) Notice: Subject to any disclaimer, the term of this patent is extended or adjusted under 35 U.S.C. 154(b) by 1098 days.

(21) Appl. No.: 11/305,135

(22) Filed: Dec. 19, 2005

(65) Prior Publication Data
US 2006/0158553 A1   Jul. 20, 2006

(30) Foreign Application Priority Data
Jan. 19, 2005   (JP) .............................. 2005-011987

(51) Int. Cl.
H04N 5/08 (2006.01)
H04N 5/10 (2006.01)

(52) U.S. Cl. .................. 348/525; 348/531; 348/534

(58) Field of Classification Search .............. 348/525, 348/500, 521, 529–531, 534; 375/354, 362, 375/364, 373, 376; H04N 5/08, 5/04, 5/06, H04N 5/10
See application file for complete search history.

(56) References Cited

U.S. PATENT DOCUMENTS 5,796,444 A * 8/1998 Inamori ................. 348/525
6,175,391 B1 * 1/2001 Kwak .................... 348/525

FOREIGN PATENT DOCUMENTS

| JP | 7-184081 | 7/1995 |
|---|---|---|
| JP | 2000-244766 | 9/2000 |
| JP | 2004-96233 | 3/2004 |
| JP | 2004-248000 | 9/2004 |
| JP | 2004-266710 | 9/2004 |

OTHER PUBLICATIONS

Korean Office Action dated May 29, 2007, with partial English language trranslation.
Office Action issued Aug. 17, 2009 from the Taiwan Patent Office in Patent Application No. 094146490 (with English-language translation).

* cited by examiner

*Primary Examiner*—Sherrie Hsia
(74) *Attorney, Agent, or Firm*—McGinn IP Law Group PLLC (57) ABSTRACT

A synchronization signal detector includes a horizontal synchronization level detector, a synchronization signal extractor, a first filter circuit, and a synchronous separator. The horizontal synchronization level detector detects a horizontal synchronization detection level HL for detecting a horizontal synchronization signal from a video signal Din. The synchronization signal extractor outputs a limited signal D1 obtained by extracting only a signal within a limit range (HL−n) to (HL+m) that is set based on the horizontal synchronization detection level HL from the video signal Din. The first filter circuit removes a high frequency component of the limited signal D1 and outputs it. The synchronous separator detects a horizontal synchronization signal HS from the output signal of the first filter circuit.

20 Claims, 6 Drawing Sheets

RELATED ART

Fig. 7

RELATED ART

Fig. 8

RELATED ART

Fig. 9

SYNCHRONOUS DETECTOR

BACKGROUND OF THE INVENTION

1. Field of the Invention

The present invention relates to a synchronous detector for detecting a synchronization signal from a composite signal including a synchronization signal, a luminance signal and a chrominance signal, a luminance signal including a synchronization signal and so on and, particularly, to a synchronous detector for detecting a synchronization signal stably.

2. Description of Related Art

A video signal contains a horizontal synchronization signal and a vertical synchronization signal so that it is reproduced correctly with a reproducing unit. The reproducing unit therefore has a synchronous detector for detecting a synchronization signal from the video signal. The synchronous detector is a critical circuit to display images stably.

For example, Japanese Unexamined Patent Application Publication No. 2000-244766, which is referred to herein as the conventional example 1, discloses a synchronous detector for detecting a horizontal synchronization signal correctly by removing a noise, chrominance signal and so on.

The synchronous detector of the conventional example 1 performs low-pass filter (LPF) processing in order to remove the noise superimposed on a video signal and detect a horizontal synchronization signal correctly. The LPF processing has the effect of reducing the noise on a horizontal synchronization portion. However, the LPF processing causes waveform distortion of a horizontal synchronization signal in the cases such as when a back porch pulse inserted in a copy guard signal exists and when a front porch period is too short for a horizontal synchronization signal. While the LPF processing reduces the amplitude of a signal superimposed on a front porch or back porch pulse, it smoothes the signal along the time axis to cause distortion of the waveform of a horizontal synchronization signal at the same time. This hinders the accurate detection of the rising or falling phase of the horizontal synchronization signal, which leads to distortion of video images.

Figure 7:
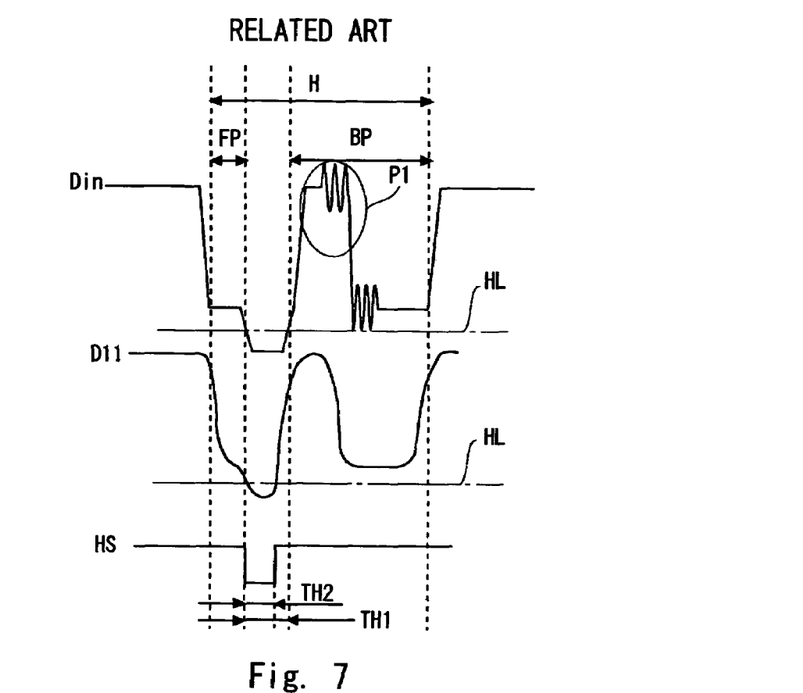
FIG. 7 is a pattern diagram showing signal waveforms processed by a synchronous detector described in the conventional example 1.

FIG. 7 is a view to describe the drawbacks due to the LFP processing. In FIG. 7, the symbol "Din" represents an input video signal, "H" represents a horizontal blanking period, "FP" represents a front porch, and "BP" represents a back porch. The video signal Din contains a back porch pulse P1 as a copy guard signal. If the LPF processing described above is performed in this case, the result is a signal D11 shown in FIG. 7. In the signal D11 after performing the LPF processing on the video signal Din, the amplitude of the back porch pulse P1 is reduced and smoothed along the time axis and therefore the rising waveform of the horizontal synchronization signal is distorted. If the horizontal synchronization signal with the distorted signal waveform is detected at a horizontal synchronization detection level HL, the rising timing of an original horizontal synchronization signal is detected wrongly in the detected synchronization signal HS. Detecting a horizontal synchronization signal HS from such a signal D11 results in a signal having a horizontal synchronization period TH2 that is different from an original horizontal synchronization period TH1.

Figure 8:
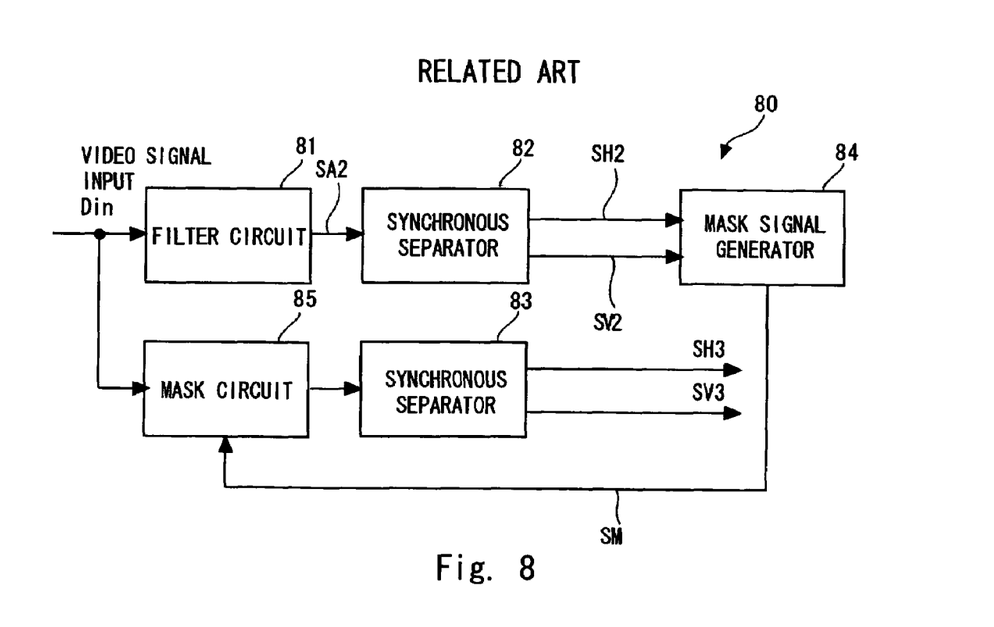
FIG. 8 is a block diagram showing the configuration of a synchronous separation apparatus described in the conventional example 2.
Figure 9:
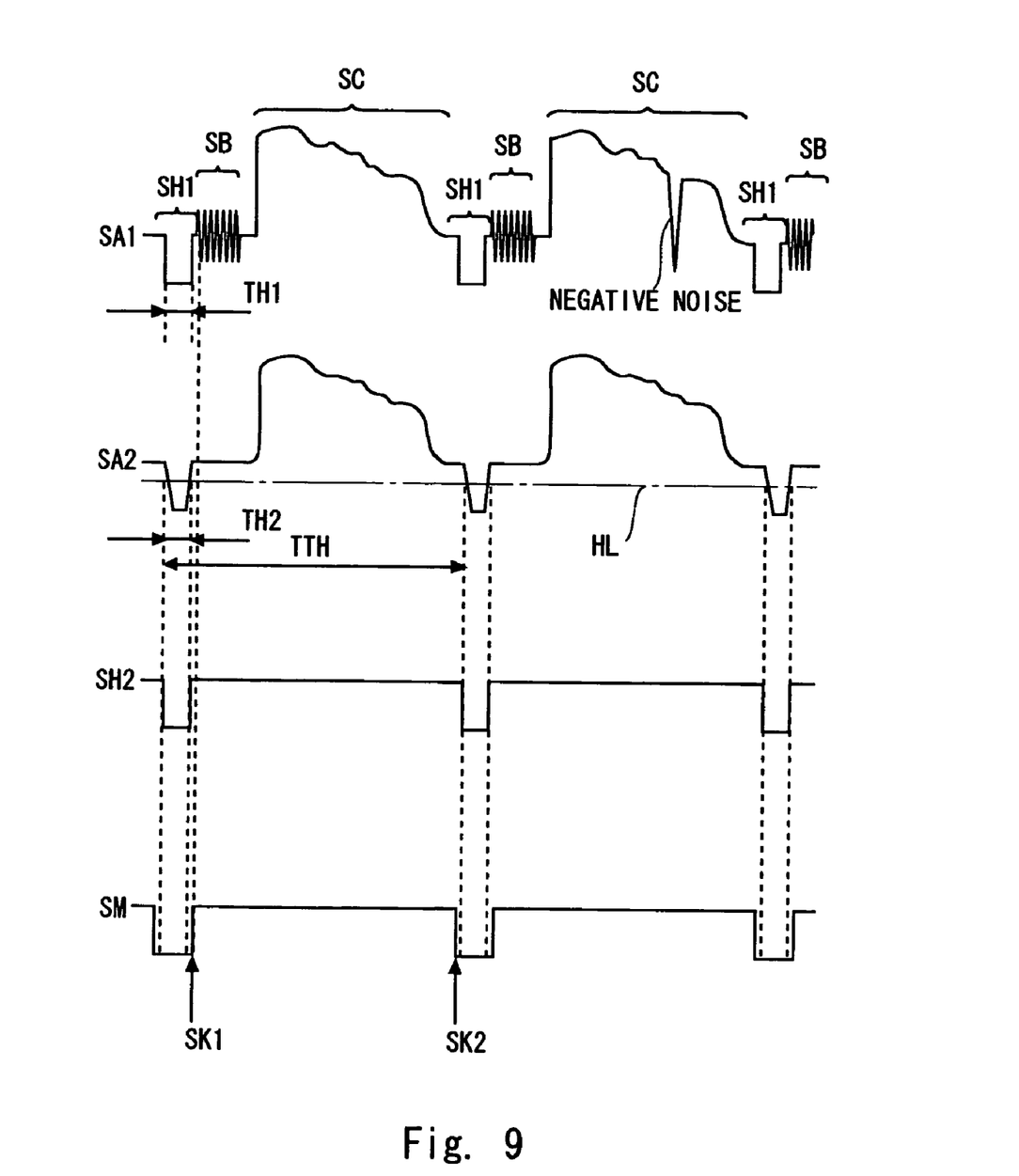
FIG. 9 is a pattern diagram showing signal waveforms output from each block of the synchronous separation apparatus shown in FIG. 8.

Since the signal waveform of the horizontal synchronization signal contained in the video signal is distorted due to removal of high frequency component by the LPF, an error occurs between the detected horizontal synchronization signal period and an actual horizontal synchronization signal period. To overcome this drawback, a technique for detecting a synchronization signal without directly performing the LPF processing is disclosed in Japanese Unexamined Patent Application Publication No. 2004-96233, which is referred to herein as the conventional example 2. FIG. 8 is a block diagram showing the configuration of a conventional synchronous separation apparatus, which is referred to hereinafter as the synchronous detector. FIG. 9 shows signals output from each block of the synchronous separation apparatus. The synchronous detector 80 described in the conventional example 2 includes a filter circuit 81, synchronous separators 82 and 83, a mask signal generator 84 and a mask circuit 85.

The filter circuit 81 receives a video signal such as SA1 shown in FIG. 9 and performs LPF processing and band pass filter (BPF) processing. It removes the high frequency component of the video signal, which is a burst signal, a chrominance signal superimposed on a luminance signal and a negative noise contained in the video signal, and outputs a signal SA2 shown in FIG. 9.

The synchronous separator 82 detects each synchronization on the signal SA2 after the filter processing at a level for detecting a horizontal synchronization signal and a vertical synchronization signal. SH2 in FIG. 9 represents a horizontal synchronization signal that is detected at a detection level HL in the synchronous separators 82.

The mask signal generator 84 generates a mask signal SM that becomes L level at a timing that is slightly earlier than a start of synchronization of the detected horizontal synchronization signal SH2, for example, and becomes H level at a timing that is slightly later than an end of synchronization. Specifically, the mask signal generator 84 detects a timing that is slightly earlier than a period TTH of the horizontal synchronization signal SH2, which is a timing (SK2) that is slightly earlier than a falling edge of the horizontal synchronization signal period TH2 and also detects a timing (SK1) that is slightly later than a rising edge of the horizontal synchronization signal period TH2. From SK1 and SK2, it generates a mask signal SM in which a period whose length is slightly longer than the horizontal synchronization signal period TH2 of the horizontal synchronization signal SH2 in the time axis direction is an unmasking period (L level period). The mask signal SM is supplied to the mask circuit 85.

The mask circuit 85 receives the mask signal SM and the video signal. The video signal passes through during the L level period of the mask signal SM while it is biased to a fixed value during the H level of the mask signal SM. The mask circuit 85 thus makes only a horizontal synchronization signal or a vertical synchronization signal pass through during the L level period of the mask signal SM. The synchronous separator 83 receives the signal composed of only the horizontal synchronization signal and the vertical synchronization signal from the mask circuit 85, extracts the horizontal synchronization signal SH3 and the vertical synchronization signal SV3 and outputs them.

The above processing allows detection of the horizontal synchronization signal and the vertical synchronization signal without performing the LPF processing on the input video signal.

The problem that jitter is generated in the detected horizontal synchronization signal due to distortion of the signal waveform of the horizontal synchronization signal as shown in FIG. 7 occurs normally when using the LPF whose cutoff frequency is about 500 KHz. Since the horizontal synchronization signal is 15,734 KHz, using such a LPF causes the falling and rising edges of the horizontal synchronization signal to be converted to a curved waveform. Thus, besides when a back porch pulse exists in a back porch as in the synchronous detector of the conventional example 1, in the cases such as when a front porch period is too short due to distortion of the horizontal synchronization signal and when large noise exists, performing the LPF processing to reduce the amplitude of each signal superimposed on a standard signal and noise to smooth it in the time axis direction affects the waveform of the horizontal synchronization signal and changes falling and rising timings. Hence, merely performing the LPF processing causes jitter and therefore unable to solve the problem if there is a horizontal blanking period where a signal or the like which is different from the standard signal is included.

On the other hand, if a synchronization signal is detected without performing the LPF processing as in the synchronous detector of the conventional example 2, a high frequency noise on the video signal causes error in detection of falling and rising edge of a horizontal synchronization signal particularly in the case of a VTR signal after repeated recording and a TV signal with a low electric field, thereby increasing jitter.

Therefore, it is possible to detect a synchronization signal accurately if the LPF processing can be performed without being affected by the cases where another signal, noise and so on exist in the blanking period such as when a back porch pulse that is inserted into a back porch as a copy guard signal exists, when a front porch period is too short due to distortion of the horizontal synchronization signal, and when large noise or the like exists.

SUMMARY OF THE INVENTION

According to an aspect of the present invention, there is provided a synchronous detector for detecting a synchronization signal from an input signal, which includes a limiting circuit outputting a signal obtained by extracting a portion in a predetermined level range from an input signal, and a synchronization detection section detecting a synchronization signal from the limited signal.

The present invention performs processing for removing a high frequency component by the first filter circuit on the limited signal after extracting a predetermined level range from an input signal, and therefore it is possible to reduce the effect of a noise, an abnormal level signal and so on included in the input signal, thereby allowing stable detection of a synchronization signal in an accurate position.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
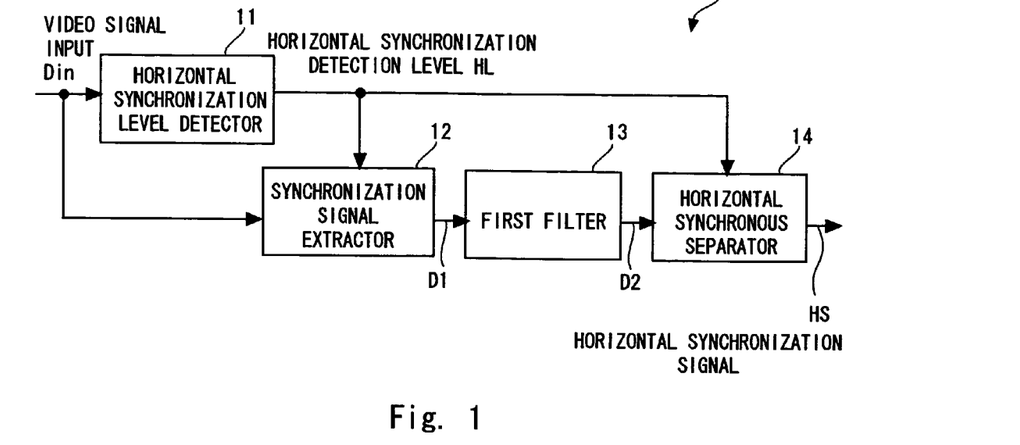
FIG. 1 is a block diagram showing a synchronous detector according to a first embodiment of the present invention.

FIG. 1 is a block diagram showing a synchronous detector according to a first embodiment of the present invention. The synchronous detector 10 includes a horizontal synchronization level detector 11, a synchronization signal extractor 12 and a synchronous detection section. The horizontal synchronization level detector 11 detects a horizontal synchronization detection level HL, which is described later, from an input signal. The synchronization signal extractor 12 receives the input signal and the horizontal synchronization detection level HL and generates a limited signal D1. The synchronous detection section detects a horizontal synchronization signal from the limited signal D1. The synchronous detection section includes a first filter circuit 13 and a horizontal synchronous separator 14. The first filter circuit 13 removes high frequency component of the limited signal D1. The horizontal synchronous separator 14 separates the horizontal synchronization signal from the signal D2 on which the LPF processing is performed by the first filter 13 and outputs a horizontal synchronization signal HS.

Each block is described in detail below. The input signal is a signal containing a synchronization signal, such as a composite signal composed of a luminance signal and a chrominance signal (color signal) superimposed with a synchronization signal, a luminance signal containing a synchronization signal and so on. This embodiment refers to an input signal as a video signal Din. The video signal Din is input to the horizontal synchronization level detector 11 and the synchronization signal extractor 12.

The horizontal synchronization level detector 11 receives the video signal Din and outputs a horizontal synchronization detection level HL for detecting a horizontal synchronization signal. The horizontal synchronization detection level HL is a level for determining falling and rising timings of a horizontal synchronization signal. Such a detection level may be detected as follows, for example. First, noise of the input video signal Din is removed by performing the LPF processing with a cutoff frequency of about 500 KHz thereon. Then, a bottom level (or a sink chip) SC and a pedestal level PL of the horizontal synchronization signal are detected. The LPF processing of this case aims at detecting the sink chip SC and the pedestal level. Therefore, there is no problem even if the signal waveform of the horizontal synchronization signal is distorted or a detecting the sink chip SC and the pedestal level is not accurate, namely they are detected roughly. Based on the sink chip SC and the pedestal level PL, an appropriate horizontal synchronization detection level HL is determined. Most simply, the horizontal synchronization detection level HL may be an intermediate value between the sink chip SC and the pedestal level PL. Besides the intermediate value, it may be a given level between the sink chip SC and the pedestal level PL depending on a device, an input signal and soon. The horizontal synchronization detection level HL thus determined is supplied to the synchronization signal extractor 12 and the horizontal synchronous separator 14.

The synchronization signal extractor 12 outputs a limited signal that is obtained by extracting a signal within a predetermined level range from a minimum extraction level to a maximum extraction level, which is referred to herein as the limit range, from the video signal Din. The limit range may be set as a range where a horizontal synchronization signal exists originally or a range where it exists highly probably based on a standard signal, which is an original level range of a horizontal synchronization signal, which is from the sink chip SC to the pedestal level PL. In this embodiment, the limit range is set to a range in close proximity to the horizontal synchronization detection level HL, for example, based on a received horizontal synchronization detection level HL.

Specifically, the synchronization signal extractor 12 sets an arbitrary level widths n and m with a horizontal synchronization detection level HL as a standard. The arbitrary level width determined by the value n for determining an lower limit of the limit range, which is the first level and referred to herein as the minimum extraction level, and the value m for determining an upper limit of the limit range, which is the second level and referred to herein as the maximum extraction level. From the values n, m and the horizontal synchronization detection level HL, the minimum extraction level of the limit range is represented by (HL−n), and the maximum extraction level of the limit range is represented by (HL+n).

Since the horizontal synchronization signal to be detected by the synchronous detector of this embodiment has a level range from the sink chip SC to the pedestal level PL, the limit range may be such that the minimum extraction level is about the sink chip SC or higher and the maximum extraction level is about the pedestal level PL or lower, for example. It is feasible to set the minimum extraction level of the limit range to be smaller than the sink chip SC and the maximum extraction level to be larger than the pedestal level PL. In this case, if the level width m is enlarged so that the maximum extraction level (HL+m) of the limit range is larger than the pedestal level PL, the signal or noise superimposed on the pedestal level PL is also extracted as the limited signal D1. On the other hand, if the level width n is enlarged so that the minimum extraction level (HL−n) of the limit range is smaller than the sink chip SC, the noise superimposed on the bottom part of the vertical signal is also extracted as the limited signal D1. Further, if the level width m, n is reduced to narrow down the limit range, the noise contained in the limited signal D1 cannot be removed completely in some cases when performing the LPF processing on the limited signal D1 to smooth it as described later. It is therefore preferred that the synchronization signal extractor 12 sets the level width n, m in consideration of these facts.

From the level width n and m that is set in this way, the synchronization signal extractor 12 configures a limiting circuit with the minimum extraction level (HL−n) and the maximum extraction level (HL+m). Thus, performing the processing to extract the signal with the level (HL−n) to (HL+m) only, which is referred to herein as the limit processing, on the input video signal Din allows acquiring a limited signal D1.

For example, if the minimum extraction level is the sink chip SC or higher and the maximum extraction level is the pedestal level PL or lower, the limited signal D1 generated by the limit processing is composed of the portion that has passed through the range corresponding to the horizontal synchronization signal portion of the video signal Din. In this case, the portion of the video signal Din at a smaller level than the sink chip SC is fixed to the sink chip SC, and the portion at a higher level than the pedestal level PL is fixed to the pedestal level PL. The limited signal D1 is supplied to the first filter circuit 13.

The first filter circuit 13 performs the LPF processing on the limited signal D1 with a cutoff frequency of about 500 KHz, for example, thereby removing a noise or a chrominance signal left on the limited signal D1. The signal D2 after the LPF processing is supplied to the horizontal synchronous separator 14.

The horizontal synchronous separator 14 detects a horizontal synchronization signal HS from the signal D2 on which the LPF processing has been performed in the first filter circuit 13 by using a horizontal synchronization detection level HL supplied from the horizontal synchronization level detector 11 as a standard and then outputs a detection result.

Figure 2:
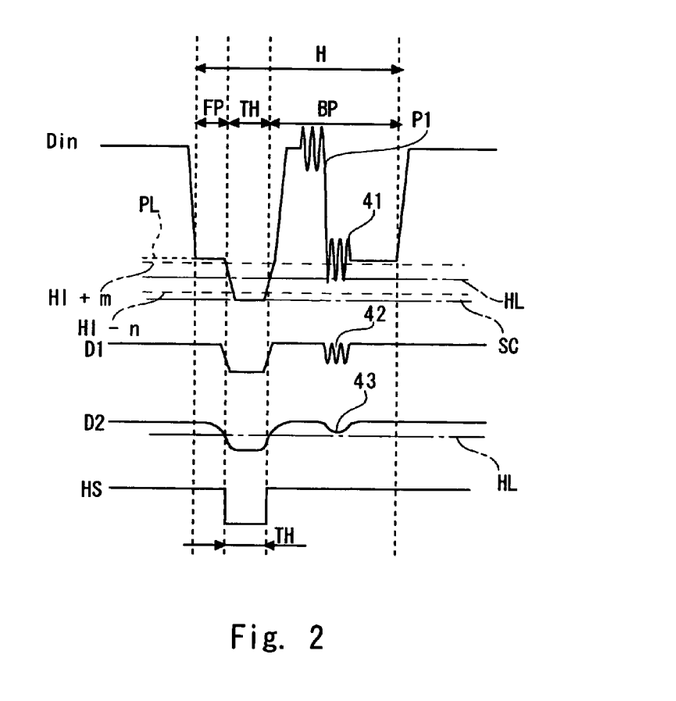
FIG. 2 is a pattern diagram showing signal waveforms of a video signal Din, a limited signal D1, a first filter circuit output signal D2, and a horizontal synchronization signal HS.

The operation of the horizontal synchronization signal in the synchronous detector of this embodiment is described herein. This embodiment describes the case of detecting a horizontal synchronization signal from a video signal where a back porch pulse as a copy guard signal is inserted in the back porch. FIG. 2 is a pattern diagram showing the signal waveforms of a video signal Din, a limited signal D1, a signal D2 after LPF processing, and a horizontal synchronization signal HS. In FIG. 2, the horizontal axis indicates a relative time and the vertical axis indicates a relative voltage level.

In the video signal Din shown in FIG. 2, a horizontal blanking period H is made up of a front porch FP, a horizontal synchronization period TH, and a back porch BP. In the horizontal blanking period H, a period from the start of the horizontal blanking period H to the start of the horizontal synchronization signal period TH is the front porch FP, and a period from the end of the horizontal synchronization signal period TH to the start of an image is the back porch BP.

For example, in the back porch BP, a color burst signal is superimposed or a copy guard signal for preventing copying of the video signal is inserted. In this embodiment, the back porch pulse P1 is inserted as a copy guard signal. For example, a video signal reproducing unit has an automatic gain control (AGC) circuit for compensating the variation of image signal level and it detects an entire attenuation from a consistently constant synchronization level and adjusts input gain. The synchronization level is acquired from a voltage difference between before and after the rise of a synchronization signal, which is a voltage difference between the sink chip SC and the back porch. Therefore, raising the voltage of the back porch to an abnormally high level causes the AGC circuit to detect it wrongly as an excessive input. The AGC circuit thus operates so as to reduce the gain as much as possible, thereby preventing copying. Other ways for copy guard include insertion of a copy guard pulse into a front porch or insertion of them in combination.

The horizontal synchronization level detector 11 detects a horizontal synchronization detection level HL from the above video signal Din, and the synchronization signal extractor 12 performs the limit processing thereon with the range of the minimum extraction level (HL−n) to the maximum extraction level (HL+m), thereby acquiring a limited signal D1 after extracting the synchronization signal as shown in FIG. 2. Thus, the limit processing extracts a signal whose relative voltage level is between the minimum extraction level (HL− n) and the maximum extraction level (HL+m) from the video signal Din as the limited signal D1.

The first filter circuit 13 performs the LPF processing on the limited signal D1, thereby acquiring a filter processing output (signal D2) shown in FIG. 2. Then, the horizontal synchronous separator 14 separates the horizontal synchronization signal HS from the signal D2 by using the horizontal synchronization detection level HL as a standard, thereby acquiring a horizontal synchronization detection output (horizontal synchronization signal HS) as shown also in FIG. 2. By extracting the level portion containing the synchronization signal from the video signal Din and performing the filter processing thereon, it is possible to detect the falling and rising timings of the horizontal synchronization signal correctly without being affected by the back porch pulse P1.

Conventionally, if a copy guard signal is superimposed, a front porch period is too short due to distortion of a horizontal synchronization signal, a signal with an abnormal level is mixed in due to noise and so on in close proximity to a horizontal synchronization signal, which is in a front porch or a back porch, such as the video signal Din having a back porch pulse P1 shown in FIG. 2, performing the LPF processing on the video signal as it is affects the waveform of the horizontal synchronization part. The effects on the waveform lead to errors in detection of falling or rising edge of the horizontal synchronization signal, which causes jitter and so on.

This embodiment extracts a level range where it is highly probable that only the horizontal synchronization signal is included from the video signal Din by using a detection level HL to detect a horizontal synchronization signal as a standard. Then, it performs the filter processing with LPF or the like on this signal (limited signal) to remove noise such as a high frequency component and detects the horizontal synchronization signal. It is thereby possible to detect the falling and rising timings of the synchronization signal stably and correctly from the video signal even if it has a back porch pulse of a copy guard signal on a horizontal blanking period, noise, or too short front porch period due to distortion of the horizontal synchronization signal and so on.

Second Embodiment

Figure 3:
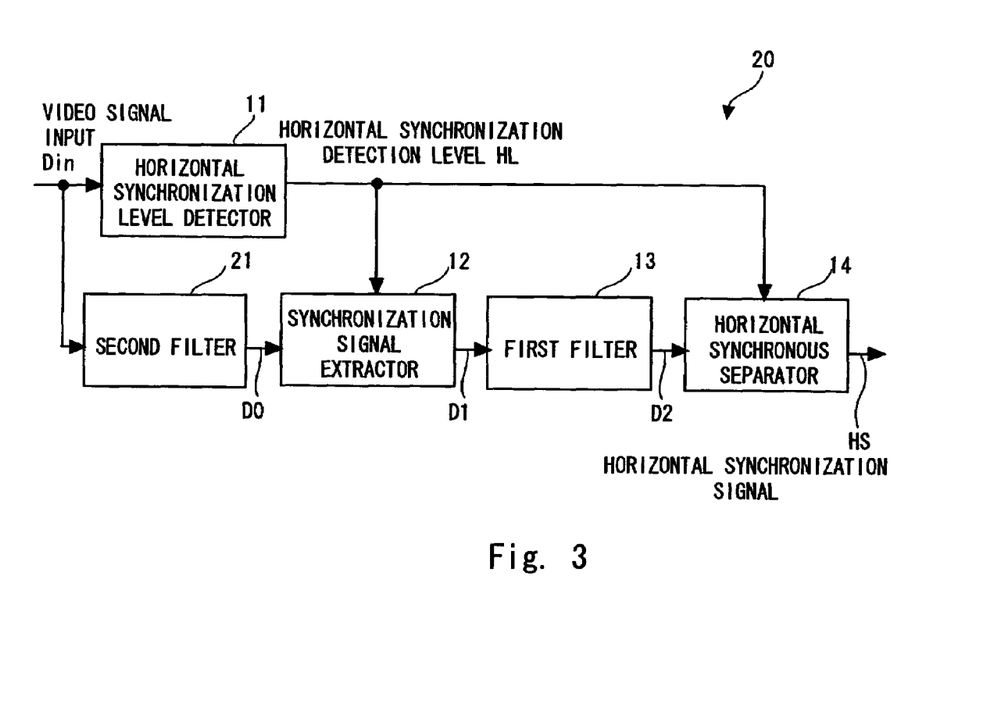
FIG. 3 is a block diagram showing a synchronous detector according to a second embodiment of the present invention.

A second embodiment of the present invention is described herein. FIG. 3 is a block diagram showing a synchronous detector according to the second embodiment of the present invention. In the horizontal synchronous detector according to this embodiment shown in FIG. 3 and according to a third embodiment shown in FIG. 5, which is described later, the same elements as in the first embodiment shown in FIG. 1 are denoted by the same reference symbols and not detailed herein.

The synchronous detector 20 of this embodiment has a second filter circuit 21 in the previous stage of the synchronization signal extractor 12, which is different from the first embodiment. Thus, the synchronization signal extractor 12 receives a filtered signal D0 after filtering a video signal Din input as an input signal to the synchronous detector 20. The synchronization signal extractor 12 generates a limited signal D1 by performing the limit processing on the filtered signal D0 with a horizontal synchronization detection level HL as a standard.

Figure 4:
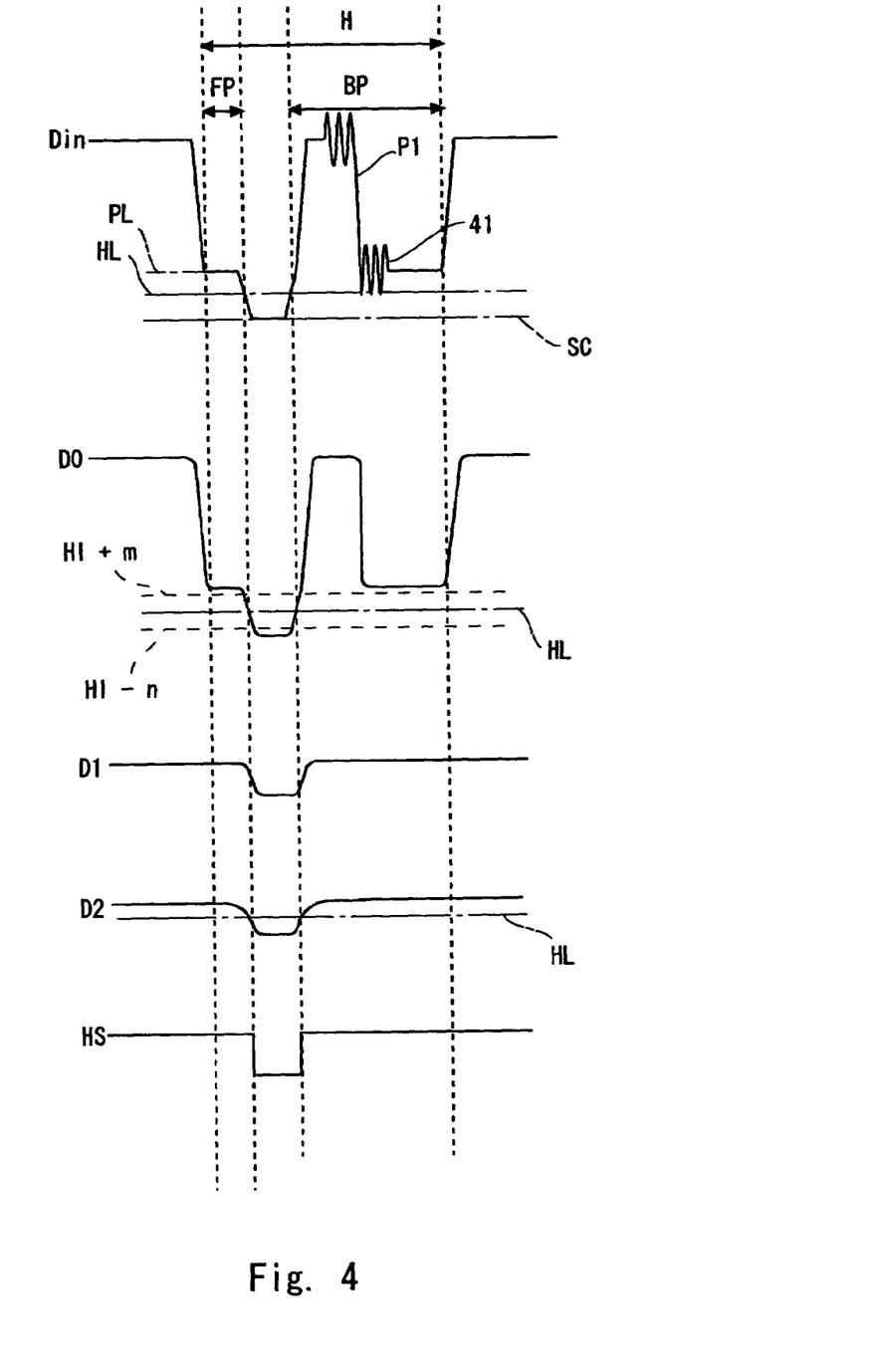
FIG. 4 is a pattern diagram showing signal waveforms of a video signal Din, a second filter circuit output signal D0, a limited signal D1, a first filter circuit output signal D2, and a horizontal synchronization signal HS.

FIG. 4 is a pattern diagram showing the signal waveforms of a video signal Din, a second filter circuit output signal D0, a limited signal D1, a first filter circuit output signal D2, and a horizontal synchronization signal HS. In FIG. 4, the horizontal axis indicates a relative time and the vertical axis indicates a relative voltage level.

As shown in FIG. 4, if the same video signal Din as in the first embodiment is input, the filtering processing is performed on the video signal Din. The second filter circuit 21 performs filter processing that is lighter than the LPF processing of the first filter circuit 13 used in the subsequent stage, such as removal of a burst signal and a chrominance signal, for example. Thus, the second filter circuit 21 aims at removing a burst signal, a chrominance signal, a high frequency noise and so on and performs LPF processing or BPF processing at a higher cutoff frequency than a cutoff frequency in the first filter circuit 13. The input video signal Din thereby becomes a filtered signal D0 where the burst signal and the high frequency noise 41 are removed as shown in FIG. 4. It is noted that the second filter circuit 21 aims at removing a high frequency component. Thus, it performs the processing with a high cutoff frequency so as to reduce the effects on the waveform of the horizontal synchronization signal in the filtered signal D0, which is different from the first filter circuit 13 in the subsequent stage or a filter included in the horizontal synchronization level detector 11.

In the first embodiment, noise 42 in the limit range from the minimum extraction level (HL−n) to the maximum extraction level (HL+m) is left as shown in FIG. 2. In this embodiment, on the other hand, the synchronization signal extractor 12 performs the limit processing on the filtered signal D0 that is filtered by the filter circuit 21 to generate a limited signal D1 and the first filter circuit 13 performs the LPF processing on the limited signal D1. It is thereby possible to obtain the limited signal D1 where DC distortion 43 (see FIG. 2) is not left.

If limit restriction is placed directly on the video signal Din as in the synchronous detector 10 of the first embodiment, a burst signal and noise can be contained partly within the limit range. In this case, if the first filter circuit 13 performs LPF processing or BPF processing on the signal partly containing the noise or the like, the DC distortion 43 or the like occurs, which raises a problem that the horizontal synchronous separator 14 may wrongly detect the DC distortion as a horizontal synchronization signal.

On the other hand, this embodiment performs preprocessing by adding a filter circuit with a higher cutoff frequency than that used in the LPF processing of the first filter circuit 13 to be used in the subsequent stage to the previous stage of the synchronization signal extractor 12. This allows the synchronization signal extractor 12 to remove a signal that is irrelevant to a synchronization signal such as a burst signal, a chrominance signal and a high frequency noise, which appears in close proximity to a pass limit of the limit range. Thus, DC distortion does not occur after the LPF processing by the first filter circuit 13 in the subsequent stage, thereby reducing errors in detection of a horizontal synchronization signal.

Third Embodiment

Figure 5:
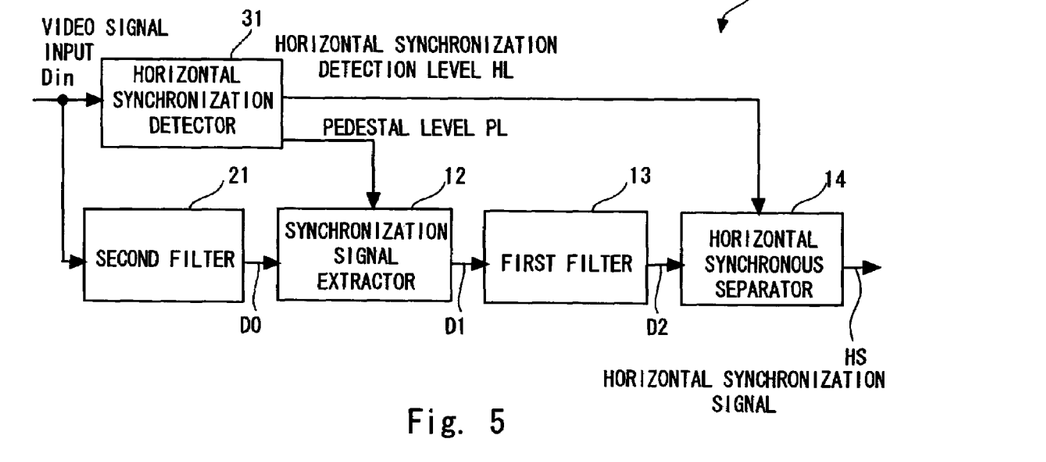
FIG. 5 is a block diagram showing a synchronous detector according to a third embodiment of the present invention.

A third embodiment of the present invention is described herein. FIG. 5 is a block diagram showing a synchronous detector according to the third embodiment of the present invention. A synchronous detector 30 of this embodiment uses a horizontal synchronization level detector 31 that outputs a pedestal level PL together with a horizontal synchronization detection level HL instead of using the horizontal synchronization level detector 11 in the synchronous detector 20 of the second embodiment.

Figure 6:
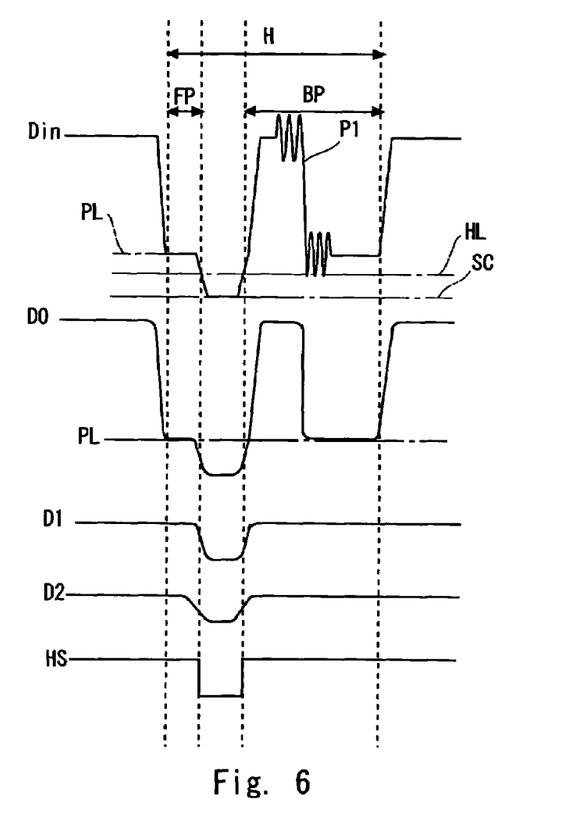
FIG. 6 is a pattern diagram showing signal waveforms of a video signal Din, a second filter circuit output signal D0, a limited signal D1, a first filter circuit output signal D2, and a horizontal synchronization signal HS.

FIG. 6 is a pattern diagram showing the signal waveforms of a video signal Din, a second filter circuit output signal D0, a limited signal D1, a first filter circuit output signal D2, and a horizontal synchronization signal HS. In FIG. 6, the horizontal axis indicates a relative time and the vertical axis indicates a relative voltage level.

The horizontal synchronization level detector 31 detects a horizontal synchronization detection level HL from the video signal Din and supplies it to the horizontal synchronous separator 14 and also supplies a pedestal level PL to the synchronization signal extractor 12. The second filer circuit 21 outputs a filtered signal D0 obtained by cutting the high frequency component only from the video signal Din. The synchronization signal extractor 12 performs the limit processing on the filtered signal D0 by using the pedestal level PL as a standard.

Specifically, the limit range is determined by using the pedestal level PL as a standard. The limit range may be simply a level that is equal to or lower than the pedestal level PL or may be a predetermined range that is equal to lower than the pedestal level PL, for example. In this embodiment, the limit range is a predetermined level that is equal to or lower than the pedestal level PL. Then, a portion with the maximum extraction level or lower in the filtered signal D0 after filtering that is output from the filter circuit 21 is made pass through, thereby generating a limited signal D1. In this way, the limited signal D1 after the limit processing with a pedestal level PL as a standard is LPF processed by the first filter circuit 13 as in the first embodiment. Then, the horizontal synchronous separator 14 detects a horizontal synchronization signal HS based on the horizontal synchronization slice level HL.

This embodiment allows easy setting of the limit range in the synchronization signal extractor 12 and enables removal of a noise or signal on a portion at a higher level than the pedestal level PL regardless of the amplitude level of a synchronous signal of an input signal. Further, it extracts a horizontal synchronization signal that exists in the range from the sink chip SC to the pedestal level PL without fail and thus generates an accurate horizontal synchronization signal without jitter even after the LPF processing.

It is apparent that the present invention is not limited to the above embodiment that may be modified and changed without departing from the scope and spirit of the invention. For example, though the synchronous detector of the first to third embodiments detects a horizontal synchronization signal from a video signal, it may be another signal such as a luminance signal containing a synchronization signal. Further, the synchronous detector performs the LPF processing on the limited signal generated by placing limit restriction on an input signal in the preset limit range based on the level of the synchronization signal to be detected before detecting a synchronization signal, thereby detecting a synchronous signal stably by removing the signal different from a standard signal. A synchronization signal to be detected may be a vertical synchronization signal. In this case, it is feasible to perform limit processing to extract only a level range and its vicinity including the vertical synchronization signal from the input signal. The synchronous detector may be a circuit that detects a horizontal synchronization signal and a vertical synchronization signal from an input signal.

What is claimed is:

1. A synchronous detector for detecting a synchronization signal from an input signal, the synchronous detector comprising:
    a limiting circuit outputting a signal obtained by extracting a portion in a predetermined level range from an input signal, as a limited signal;
    a synchronization detection section detecting a synchronization signal from the limited signal; and
    a level detector detecting a slice level,
    wherein the limiting circuit sets an arbitrary width including the slice level as the predetermined level range, and the synchronization detection section detects the synchronization signal based on the slice level.

2. The synchronous detector according to claim 1, wherein the predetermined level ranges is set based on a level range of the synchronization signal.

3. The synchronous detector according to claim 2, wherein the predetermined level range is equal to or higher than a first level and equal to or lower than a second level, and the limiting circuit outputs the limited signal that sets a signal with a lower level than the first level in the input signal to the first level and sets a signal with a higher level than the second level in the input signal to the second level.

4. The synchronous detector according to claim 2, wherein the predetermined level range is equal to or higher than approximately a bottom level of the synchronization signal and equal to or lower than approximately a pedestal level.

5. The synchronous detector according to claim 1, wherein the synchronization detection section includes a first filter circuit removing a high frequency component of the limited signal and outputting the signal, and a synchronous separator detecting a synchronization signal from an output signal of the first filter circuit.

6. The synchronous detector according to claim 5, further comprising: a second filter circuit outputting a filtered signal after removing a high frequency component from an input signal, wherein the limiting circuit receives the filtered signal as the input signal and generates the limited signal from the filtered signal.

7. The synchronous detector according to claim 6, wherein the second filter circuit is a low pass filter with a higher cutoff frequency than the first filter circuit or a band pass filter used to remove a predetermined signal.

8. A synchronous detector for detecting a synchronization signal from an input signal, the synchronous detector comprising:
    a limiting circuit outputting a signal obtained by extracting a portion in a predetermined level range from an input signal, as a limited signal;
    a synchronization detection section detecting a synchronization signal from the limited signal; and
    a level detector detecting a slice level and a pedestal level;
    wherein the limiting circuit sets an arbitrary width to the pedestal level as the predetermined level range, and the synchronization detection section detects the synchronization signal based on the slice level.

9. The synchronous detector according to claim 8, wherein the synchronization detection section includes a first filter circuit removing a high frequency component of the limited signal and outputting the signal, and a synchronous separator detecting a synchronization signal from an output signal of the first filter circuit.

10. The synchronous detector according to claim 9, further comprising: a second filter circuit outputting a filtered signal after removing a high frequency component from an input signal, wherein the limiting circuit receives the filtered signal as the input signal and generates the limited signal from the filtered signal.

11. The synchronous detector according to claim 10, wherein the second filter circuit comprises a low pass filter with a higher cutoff frequency than the first filter circuit or a band pass filter used to remove a predetermined signal.

12. The synchronous detector according to claim 8, wherein the predetermined level ranges is set based on a level range of the synchronization signal as a limited signal.

13. The synchronous detector according to claim 12, wherein the predetermined level range is equal to or higher than a first level and equal to or lower than a second level, and the limiting circuit outputs the limited signal that sets a signal with a lower level than the first level in the input signal to the first level and sets a signal with a higher level than the second level in the input signal to the second level.

14. The synchronous detector according to claim 12, wherein the predetermined level range is equal to or higher than approximately a bottom level of the synchronization signal and equal to or lower than approximately a pedestal level.

15. A synchronous detector for detecting a synchronization signal from an input signal, the synchronous detector comprising:
   a limiting circuit outputting a signal obtained by extracting a portion in a predetermined level range from an input signal, as a limited signal; and
   a synchronization detection section detecting a synchronization signal from the limited signal;
   wherein the synchronization detection section includes a first filter circuit removing a high frequency component of the limited signal and outputting the signal, and a synchronous separator detecting a synchronization signal from an output signal of the first filter circuit.

16. The synchronous detector according to claim 15, further comprising: a second filter circuit outputting a filtered signal after removing a high frequency component from the input signal, wherein the limiting circuit receives the filtered signal as the input signal and generates the limited signal from the filtered signal.

17. The synchronous detector according to claim 16, wherein the second filter circuit comprises a low pass filter with a higher cutoff frequency than the first filter circuit or a band pass filter used to remove a predetermined signal.

18. The synchronous detector according to claim 15, wherein the predetermined level ranges is set based on a level range of the synchronization signal as a limited signal.

19. The synchronous detector according to claim 18, wherein the predetermined level range is equal to or higher than a first level and equal to or lower than a second level, and the limiting circuit outputs the limited signal that sets a signal with a lower level than the first level in the input signal to the first level and sets a signal with a higher level than the second level in the input signal to the second level.

20. The synchronous detector according to claim 18, wherein the predetermined level range is equal to or higher than approximately a bottom level of the synchronization signal and equal to or lower than approximately a pedestal level.

* * * * *